United States Patent
Knobloch et al.

(10) Patent No.: US 12,487,124 B2
(45) Date of Patent: Dec. 2, 2025

(54) SYSTEMS AND METHODS FOR MEASURING TEMPERATURE

(71) Applicant: General Electric Company, Schenectady, NY (US)

(72) Inventors: Aaron Jay Knobloch, Niskayuna, NY (US); Adam Halverson, Albany, NY (US)

(73) Assignee: General Electric Company, Evendale, OH (US)

( * ) Notice: Subject to any disclaimer, the term of this patent is extended or adjusted under 35 U.S.C. 154(b) by 978 days.

(21) Appl. No.: 17/588,917

(22) Filed: Jan. 31, 2022

(65) Prior Publication Data

US 2023/0243704 A1 Aug. 3, 2023

(51) Int. Cl.
*G01J 5/02* (2022.01)
*G01J 5/00* (2022.01)
*G01J 5/0806* (2022.01)
*G01J 5/12* (2006.01)

(52) U.S. Cl.
CPC ............. *G01J 5/026* (2013.01); *G01J 5/0088* (2013.01); *G01J 5/0806* (2013.01); *G01J 5/12* (2013.01)

(58) Field of Classification Search
CPC .. G01J 5/026; G01J 5/90; G01J 5/0088; G01J 5/0806; G01J 5/12; G01J 5/025; G01J 5/0846; G01J 5/60; G01J 5/802; G01J 5/0014; G01J 5/0022; G01J 5/602; G01J 5/10
See application file for complete search history.

(56) References Cited

U.S. PATENT DOCUMENTS

| | | | |
|---|---|---|---|
| 4,037,473 A | * | 7/1977 | Compton ................ G01J 5/061 374/131 |
| 4,974,182 A | | 11/1990 | Tank |
| 7,633,066 B2 | | 12/2009 | Antel, Jr. et al. |
| 8,790,006 B2 | | 7/2014 | Li et al. |
| 9,046,411 B2 | | 6/2015 | Wang et al. |
| 9,528,880 B2 | | 12/2016 | Wang et al. |
| 9,599,514 B2 | | 3/2017 | Estevadeordal et al. |
| 9,612,160 B2 | | 4/2017 | Earl et al. |
| 10,815,817 B2 | | 10/2020 | Ahmadian et al. |
| 2009/0285259 A1 | | 11/2009 | Allen et al. |

(Continued)

OTHER PUBLICATIONS

Cassady, High Accuracy Multi-color Pyrometry for High Temperature Surfaces, 2003, ResearchGate, p. 3,4 (Year: 2003).*

(Continued)

*Primary Examiner* — Catherine T. Rastovski
*Assistant Examiner* — Nicholas Zaragoza
(74) *Attorney, Agent, or Firm* — McCarter & English, LLP

(57) ABSTRACT

Systems and methods disclosed herein use a multi-color pyrometer configured to determine a first temperature in a high temperature range and a single-color pyrometer configured to determine second temperature in a low temperature range. The system uses information gained from determination of the first temperature in the high temperature range to facilitate later determining the second temperature in the low temperature range. The first temperature in the high temperature range and the second temperature in the low temperature range are used to monitor and control different engine operations that occur at different times.

20 Claims, 4 Drawing Sheets

(56) References Cited

U.S. PATENT DOCUMENTS

| | | | |
|---|---|---|---|
| 2013/0118183 A1* | 5/2013 | Wang | F01D 17/20 |
| | | | 250/339.04 |
| 2019/0255654 A1* | 8/2019 | Beckett | B23K 26/032 |

OTHER PUBLICATIONS

AZO Sensors, High-Temperature Environment Thermal Measurements, Dexter Research Center, Inc., Oct. 18, 2018, 9 Pages. https://www.azosensors.com/article.aspx?ArticleID=1400.

Dagel et al., Four-Color Imaging Pyrometer for Mapping Temperatures of Laser-Based Metal Processes, SAND2016-3453C, Sandia National Laboratories, Albuquerque New Mexico, 2016, 8 Pages. https://www/.osti.gov/servlets/purl/1365152.

Dexter Research Center, Dexter Thermopile Product Selection Guide, 23 Pages. https://dexterresearch.com/product-finder/thermopile-selection-guide/.

EOC (Electro Optical Components, Inc.), NDIR Gas Measurement Module, Santa Rosa, CA, Nov. 2013, 3 Pages. htttps://eoc-inc.com/wp-content/uploads/2019/06/TS2xXXX-HT-High-Temp-CO2-Module.pdf.

Hamamatsu, Handbook Thermal Detectors, Chapter 07, 10 Pages. https://www.hamamatsu.com/resources/pdfssd_e07_handbook_Thermal_detectors.pdf.

Hamamatsu, Thermopile Detectors, Products-Optical Sensors-Infrared Detectors, 2 Pages. https://www.hamamatsu.com/us/en/product/optical-sensors/infrared-detector/thermopile-detector/index.html.

Li et al., Passive Absorption/Emission Spectroscopy for Gas Temperature Measurements in Gas Turbine Engines, GT2011-45152, Proceedings of ASM Turbo Expo 2011: Power for Land, Sea, and Air, Vancouver Canada, Jun. 6-10, 2011, 13 Pages.

Melexis Inspired Engineering, Thermal Infrared Thermopile Sensor for High Temperature Measurements, MLX90616, 7 Pages. https://www.melexis.com/en/product/MLX90616/Thermal-Infrared-Thermopile-Sensor-High-Temperature-Measurements.

* cited by examiner

SYSTEMS AND METHODS FOR MEASURING TEMPERATURE

STATEMENT REGARDING FEDERALLY SPONSORED RESEARCH OR DEVELOPMENT

This invention was made with United States Government support. The United States Government may have certain rights in the invention.

FIELD

The present disclosure relates to systems and methods for measuring temperature of a component, such as a component or gas of a turbomachine or an engine.

BACKGROUND

At least some known turbomachines, such as gas turbine engines, include a plurality of turbine rotor blades that channel high-temperature fluids through the gas turbine engines. Such turbine rotor blades in the hot gas path may wear over time. For example, such hot gas path components may exhibit stress-related cracking, such stresses induced by temperatures at or above predetermined parameters. Therefore, many known gas turbine engines include temperature monitoring systems (e.g., using pyrometers or thermocouples) that provide operational temperature data in real time, i.e., at the time of measurement.

Also, many known gas turbine engines monitor temperature data as an input to adjust operation, e.g., the firing rate of the gas turbine engine (i.e., the rate and/or ratio of fuel and air being combusted in the engine). In some cases, the temperature data may be used as an input into certain protective features of the engine.

At low engine temperatures, the temperature may be monitored to determine that the engine is warming up during a startup operation. It is difficult to find a pyrometer that can cover both low temperature during startup and high temperature during an operation such as cruise. For low temperatures, thermocouples may be used to measure a temperature in a lower range. However, thermocouples can add weight to the system and multiple thermocouples may be required.

Accordingly, systems and methods to improve temperature measurement would be welcomed in the art.

BRIEF DESCRIPTION OF THE DRAWINGS

A full and enabling disclosure of the present disclosure, including the best mode thereof, directed to one of ordinary skill in the art, is set forth in the specification, which refers to the appended figures, in which.

DETAILED DESCRIPTION

Figure 1:
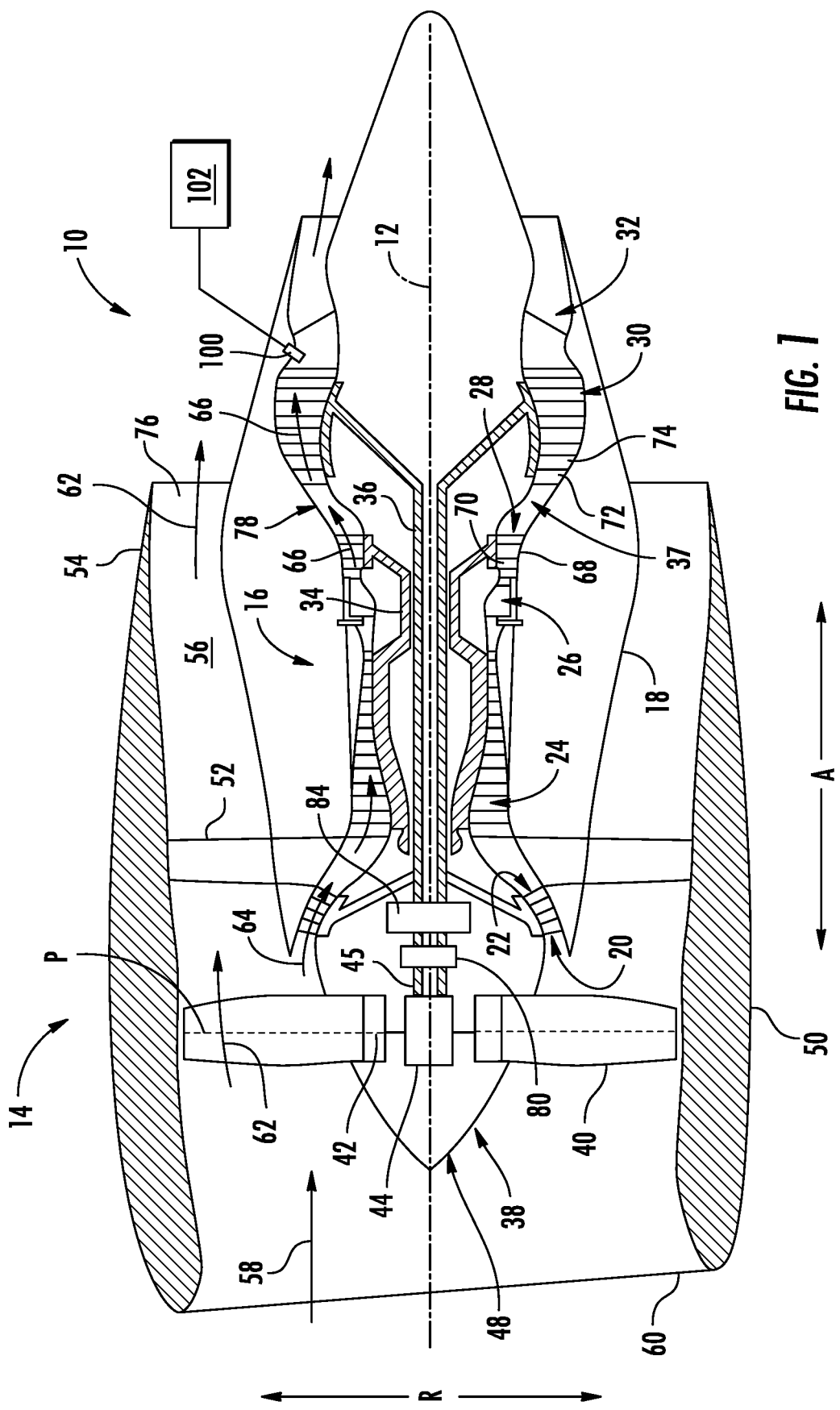
FIG. 1 is a schematic view of a gas turbine engine including a thermal measurement system, in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The systems and methods disclosed herein use a multi-color pyrometer configured to determine temperature in a high temperature range and a single-color pyrometer configured to determine temperature in a low temperature range. The system uses information gained from determination of a temperature in the high temperature range to facilitate later determining a temperature in a low temperature range.

The temperature in the high temperature range and the temperature in the low temperature range are used to monitor and control different engine operations that occur at different times. For example, the temperature in the high temperature range may be an input to adjust operation such as the firing rate of the gas turbine engine, the rate and/or ratio of fuel and air being combusted in the engine, etc. The temperature in the low temperature range may be an input for monitoring startup firing or transient behavior.

A multi-color optical pyrometer that is configured for the high temperature range may lack a signal in the low temperature range. A single color pyrometer is used instead for the low temperature range. Although the system does not measure temperature simultaneously in the high temperature range and the low temperature range, information that is gained from determining a temperature in the high temperature range can be used to later determine a temperature in the low temperature range. For example, because the multicolor pyrometer and the single color pyrometer use the same lens to receive light or photons emitted from an object in a hot gas path of an engine, fouling (e.g., attenuation) and emissivity information may be determined from determining a temperature in the high temperature range and used to determine a temperature in the low temperature range.

One benefit of the system is the ability of the single color pyrometer to measure a temperature in a low temperature range for a low temperature operation. Another benefit is that the single color pyrometer is co-located with the multicolor pyrometer. This co-location means adding less weight to the engine and using less space in the engine as compared to a completely separate measurement system such as a thermocouple.

As shown in FIG. 1, a turbofan engine 10 defines an axial direction A (extending parallel to a longitudinal centerline axis 12 provided for reference), a radial direction R, and a circumferential direction (i.e., a direction extending about the axial direction A; not depicted).

In general, the turbofan engine 10 includes a fan section 14 and a turbomachine 16 disposed downstream from the fan section 14. The turbomachine 16 is sometimes also, or alternatively, referred to as a "core turbine engine".

The turbomachine 16 includes an outer casing 18 that is substantially tubular and defines an inlet 20. The outer casing 18 encases, in serial flow relationship: a compressor section including a first, booster or low pressure (LP) compressor 22 and a second, high pressure (HP) compressor 24; a combustion section including a combustor 26; a turbine section including a first, high pressure (HP) turbine 28 and a second, low pressure (LP) turbine 30; and a jet exhaust nozzle section 32.

A high pressure (HP) shaft 34 or spool drivingly connects the HP turbine 28 to the HP compressor 24. A low pressure (LP) shaft 36 or spool drivingly connects the LP turbine 30 to the LP compressor 22. The compressor section, combustion section, turbine section, and jet exhaust nozzle section 32 are arranged in serial flow order and together define a core air flowpath 37 through the turbomachine 16.

The fan section 14 includes a variable pitch, single stage fan 38. The fan 38 includes a plurality of rotatable fan blades 40 coupled to a disk 42 in a spaced apart manner. As depicted, the fan blades 40 extend outwardly from disk 42 generally along the radial direction R.

The fan blades 40 are operatively coupled to one or more actuation members 44. For example, the actuation members 44 may be configured to vary the pitch of the fan blades 40 with respect to pitch axis P. As described in further detail below, the fan blades 40 may have a forward pitch to produce a forward thrust or may have a reverse pitch to produce a reverse thrust.

A fan drive shaft 45 is operatively connected to and drives the fan 38. The fan blades 40, disk 42, and actuation member 44 are together rotatable about the longitudinal centerline axis 12 by the fan drive shaft 45. The fan section 14 is connected to the turbomachine 16 during a forward thrust operation. In particular, the fan drive shaft 45 is connected to the LP shaft 36.

The disk 42 is covered by a rotatable front nacelle 48 aerodynamically contoured to promote an airflow through the plurality of fan blades 40. Additionally, the fan section 14 includes an annular fan casing or outer nacelle 50 that at least partially, and for the embodiment depicted, circumferentially, surrounds the fan 38 and at least a portion of the turbomachine 16.

Moreover, for the embodiment depicted, the nacelle 50 is supported relative to the turbomachine 16 by a plurality of circumferentially-spaced outlet guide vanes 52. A downstream section 54 of the nacelle 50 extends over an outer portion of the turbomachine 16 to define a bypass airflow passage 56 therebetween.

During a forward thrust operation of the turbofan engine 10, a volume of air 58 enters the turbofan engine 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrow 64 is directed or routed into the core air flowpath 37.

The pressure of the second portion of air 64 is increased as it is routed through the LP compressor 22 and the HP compressor 24 and into the combustor 26. More specifically, the compressor section, including the LP compressor 22 and HP compressor 24, defines an overall pressure ratio during operation of the turbofan engine 10 at a rated speed. The overall pressure ratio refers to a ratio of an exit pressure of the compressor section (i.e., a pressure of the second portion of air 64 at an aft end of the compressor section) to an inlet pressure of the compressor section (i.e., a pressure of the second portion of air 64 at the inlet 20 to the compressor section).

The compressed second portion of air 64 from the compressor section mixes with fuel and is burned within the combustion section to provide combustion gases 66. The combustion gases 66 are routed from the combustor 26, through the HP turbine 28 where a portion of thermal and/or kinetic energy from the combustion gases 66 is extracted via sequential stages of HP turbine stator vanes 68 that are coupled to the outer casing 18 and a plurality of HP turbine rotor blades 70 that are coupled to the HP shaft 34 or spool, thus causing the HP shaft 34 or spool to rotate, thereby supporting operation of the HP compressor 24.

The combustion gases 66 are then routed through the LP turbine 30 where a second portion of thermal and kinetic energy is extracted from the combustion gases 66 via sequential stages of LP turbine stator vanes 72 that are coupled to the outer casing 18 and a plurality of LP turbine rotor blades 74 that are coupled to the LP shaft 36 or spool, thus causing the LP shaft 36 or spool to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

The engine 10 further includes a thermal measurement system 100 and an engine control 102. The thermal measurement system 100 is configured to measure a temperature of an object (e.g., turbine rotor blades 74) in the hot gas path 78 and to provide the temperature to the engine control 102. The engine control 102 may monitor the health of the components of the engine 10 and control aspects (e.g., geometries, operations, actuators) of the engine 10 based on the temperature.

The engine control 102 may be located proximate to or remote from the thermal measurement system 100, or the thermal measurement system 100 may include the engine control 102. For example, the engine control 102 may be a Full Authority Digital Engine Control (FADEC) for providing full digital control of the engine 10, an engine control unit (ECU), or the like.

Figure 2:
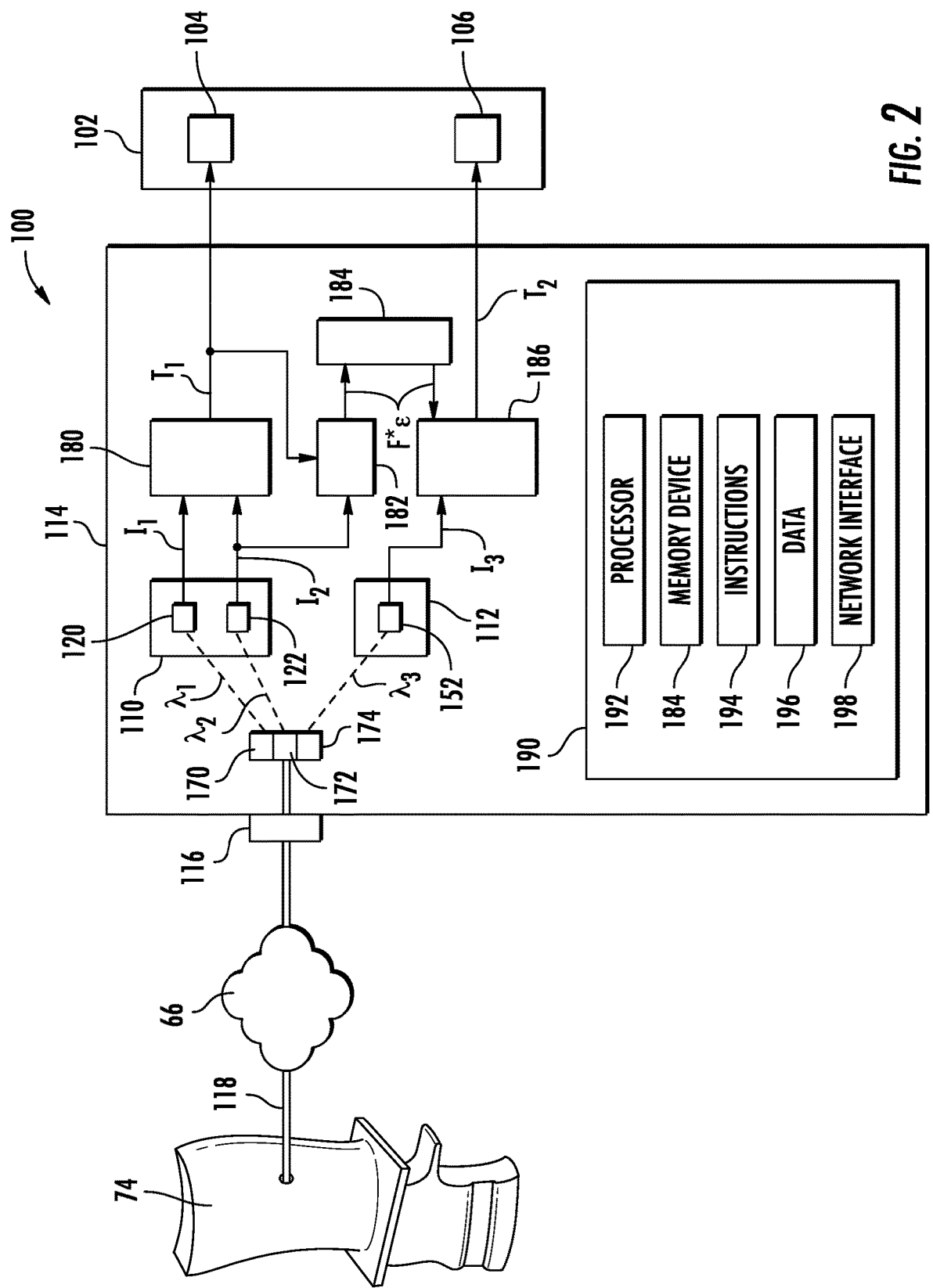
FIG. 2 is a schematic view of the thermal measurement system of FIG. 1, in accordance with an exemplary aspect of the present disclosure.

Referring additionally to FIG. 2, providing a schematic illustration of the thermal measurement system 100 and engine control 102, the engine control 102 includes engine control modules 104, 106 to monitor and/or control operations of the engine 10. For purposes of teaching, the engine control modules 104, 106 may include a set of control loops, control parameters, computer executable instructions, software modules, and the like. In alternative embodiments, the thermal measurement system 100 can include the engine control modules 104, 106.

The first engine control module 104 uses a high target temperature T1 as input for monitoring or controlling high temperature operations of the engine 10 such as those performed during idle, takeoff, cruise, or approach. The second engine control module 106 uses a low target temperature T2 as input for monitoring or controlling low temperature operations of the engine 10 such as those performed during startup of the engine 10. For example, the high target temperature T1 and the low target temperature T2 are exhaust gas temperatures (EGT).

During takeoff, cruise, approach, engine accelerations, decelerations etc., the combustion gases 66 and/or objects (e.g., turbine rotor blades 74) in the hot gas path 78 have a high temperature in a high temperature range. For example, the high temperature range may be 1200 to 2600 Fahrenheit or 922 to 1700 Kelvin (K). The first engine control module 104 uses the high target temperature T1 for monitoring or controlling the engine 10 when the combustion gases 66 and/or objects (e.g., turbine rotor blades 74) in the hot gas path 78 have a high temperature in a high temperature range.

The thermal measurement system 100 determines the high target temperature T1 in the high temperature range as input for the first engine control module 104. The first engine control module 104 may monitor the high target temperature T1 to determine the performance status and health of the engine 10. The first engine control module 104 may also control the engine 10 based on the high target temperature T1 (e.g., the firing of the engine 10). As the first engine control module 104 monitors and controls the engine 10 during takeoff, cruise, approach etc., the thermal measurement system 100 is generally configured such that the accuracy of the high target temperature T1 is high.

During startup, etc., the combustion gases 66 and/or objects (e.g., turbine rotor blades 74) in hot gas path 78 have a low temperature in a low temperature range. For example, the low temperature range may be 500 to 1000 Fahrenheit (F) or Kelvin (K). The second engine control module 106 uses the low target temperature T2 during startup, etc., when the combustion gases 66 and/or objects (e.g., turbine rotor blades 74) in hot gas path 78 have a low temperature in a low temperature range.

The thermal measurement system 100 determines the low target temperature T2 in the low temperature range as input for the second engine control module 106. The second engine control module 106 may monitor startup firing or transient behavior, for example, by monitoring that the low target temperature T2 is increasing after the engine 10 is started. As described in further detail below, the direction and relative movement of the low target temperature T2 may be sufficient for purposes of monitoring temperatures in the low temperature range during startup. Accordingly, the accuracy of the low target temperature T2 in the low temperature range may be generally lower than the accuracy of the high target temperature T1 in the high temperature range.

The engine control modules 104, 106 are generally associated with different temperature ranges and with operations of the engine 10 that generally do not overlap in time.

Continuing with FIG. 2, showing a schematic illustration of the thermal measurement system 100 and engine control 102, the thermal measurement system 100 is described in further detail. The thermal measurement system 100 is configured to determine the high target temperature T1 in the high temperature range as input for the first engine control module 104 during a high temperature operation of the engine 10, and to determine a low target temperature T2 in the low temperature range as input for the second engine control module 106 during a low temperature operation of the engine 10. Although one example location of the thermal measurement system 100 is illustrated in FIG. 1, the thermal measurement system 100 may be positioned, for example, at other locations downstream of the combustor 26. The thermal measurement system 100 may be directed at any rotating or static part or object, such as a turbine rotor blade 74 or blisk.

In particular, the thermal measurement system 100 includes a multicolor pyrometer 110 configured to measure temperatures in the high temperature range and a single color pyrometer 112 configured to measure temperatures in the low temperature range. In general, the multicolor pyrometer 110 uses lower-wavelength bands to measure higher temperatures and the single color pyrometer 112 uses higher-wavelength bands to measure lower temperatures.

The multicolor pyrometer 110 and the single color pyrometer 112 may be directed toward, and in optical communication with, an object in the hot gas path 78 exposed to the combustion gases 66. In FIG. 2, the object is a turbine rotor blade 74. In alternative embodiments, the multicolor pyrometer 110 and the single color pyrometer 112 may be directed toward, and in optical communication with, other objects in the hot gas path 78.

The multicolor pyrometer 110 and the single color pyrometer 112 are co-located in a sensor housing 114. The sensor housing includes a lens 116 through which light 118 emitted from the turbine rotor blade 74 is received for both the multicolor pyrometer 110 and the single color pyrometer 112.

The multicolor pyrometer 110 and the single color pyrometer 112 may include detectors that are optically filtered to a predetermined wavelength band that defines an optical sensing range. In some embodiments, the detectors are optically filtered using band pass filters.

The wavelength or wavelength band may be selected such that data is received from a spot on turbine rotor blade 74 over one wavelength with little or no interaction with water content of the combustion gases 66. As the water content of the combustion gases 66 can absorb and remit light 118 from the turbine rotor blade 74, selecting the wavelength or wavelength band such that there is little or no interaction with the water content of the combustion gases 66 allows the temperature of the turbine rotor blade 74 or object to be more accurately determined.

The temperature of the turbine rotor blade 74 or another moving part may be sufficient for estimating the temperature of the combustion gases 66. For example, a moving part gets a natural averaging of the gas temperature by moving through the hot gas path and the distribution of temperatures in the gas path.

Figure 3:
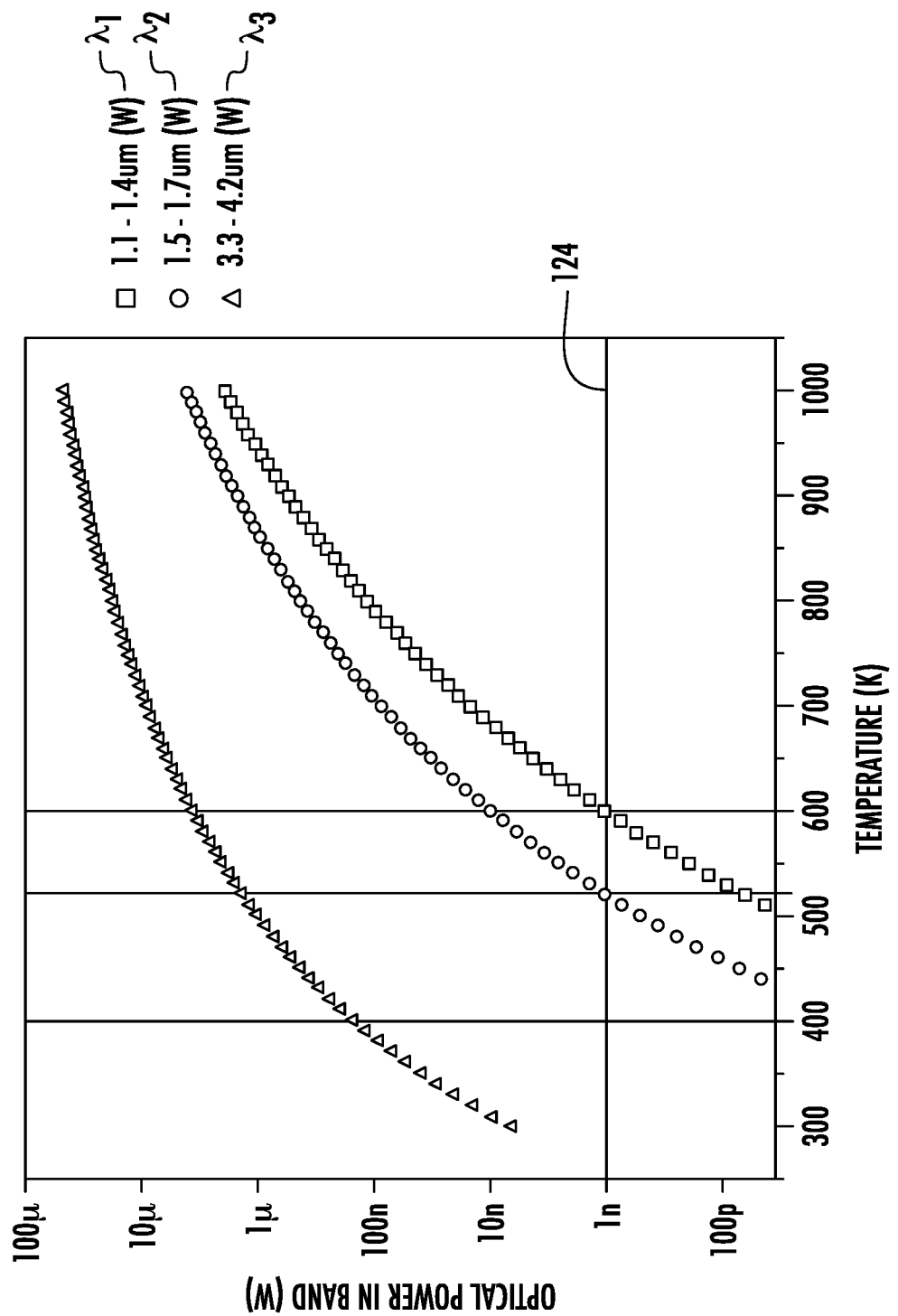
FIG. 3 is a graphical illustration of optical power vs. temperature for different wavelength bands in accordance with an exemplary aspect of the present disclosure.

Referring also to FIG. 3, showing exemplary optical power at object temperatures for different wavelength bands which do not interact with water in the combustion gases 66, a first wavelength band may have a center wavelength in the band between 1.1 micrometer (um) to 1.4 um wavelengths. A particular embodiment may be centered at 1.24 um. A second wavelength band may have a center wavelength in the band between 1.5 um to 1.7 um. For example, the second wavelength band may be centered at 1.625 um. A third wavelength band may have a center wavelength in the band between 3.3 um to 4.4 um wavelengths.

As an example, a band pass filter may have a full widths half max of 50 nm for 1.625 um and 1.24 um.

Detectors may be filtered for other wavelength bands (not shown). For example, a detector may be filtered for a 2.1 um to 2.4 um wavelength band.

Examining the relationship between optical power (e.g., optical flux) and object temperature, the amount of optical power output for a wavelength band decreases exponentially as temperature decreases. As target temperature decreases, the amount of optical flux in each of the bands decreases. Relatively speaking, at lower target temperatures, higher wavelength bands have more optical flux which can result in higher signals and lower minimum resolved temperature based on having adequate signal to noise.

A lower end of a temperature range for a detector may be defined at a temperature where the output of the detector meets a threshold amount of optical power output 124. The threshold amount of optical power output 124 may be where the detector output has an acceptable signal to noise ratio or otherwise provides a measurement with acceptable accuracy. For example, the threshold amount of optical power output 124 may be 1 nanowatt (nW) as shown in FIG. 3.

An upper end of a temperature range for a detector may be defined at a temperature where the output of the detector is saturated (e.g., the maximum power output that can be achieved by an amplifier). For example, an upper end for the first temperature range for a detector filtered for the first wavelength band may be 2500 F and an upper end for the second temperature range for a detector filtered for the second wavelength band may be 2500 F.

Different types of detectors may be able to perform in the different wavelength bands. For example, InGaAs detectors (both standard and "extended" wavelength detectors) may have limited responsivity at longer wavelengths (e.g., above 2.6 um). A standard InGaAs detector may have a responsivity cut off at 1.7 um while extended InGaAs responsivity may have a cutoff of 2.6 um allowing for optical response or signal over a wider range. The extended InGaAs detector performance (e.g., accuracy) is generally not as good as standard InGaAs due to poorer electrical characteristics. For example, there may be higher dark current and lower shunt resistance than standard InGaAs detectors.

Referring to FIG. 3, wavelengths higher than 2.6 um are needed to for a lower pyrometer minimum resolved temperature. At the third water transparent wavelength band, 3.3 to 4.4 um (e.g., a long wavelength above 1.7 um or 2.6 um), other detectors or materials, such as thermopiles or other long wave detectors, can be used to measure the optical flux. A thermopile may be used at higher wavelengths (e.g.) as the thermopile is sensitive to such wavelengths. For example, the thermopile is sensitive to a range of wavelengths that InGaAs is not sensitive to. As the temperature decreases, the spectrum emitted by an object (e.g., blackbody) shifts out of the InGaAs detector range, but the thermopile is still sensitive in those regions. A band pass filter may be used to filter a thermopile in a higher wavelength band.

The multicolor pyrometer 110 includes a plurality of detectors 120, 122. The detectors 120, 122 are optically filtered to a predetermined wavelength band that defines an optical sensing range. In some embodiments, these filters are band pass filters. In some embodiments, the detectors 120, 122 of the multicolor pyrometer 110 are Indium Gallium Arsenide (InGaAs) detectors.

For example, the first detector 120 is filtered to the first wavelength band with a center wavelength in the band between 1.1 micrometer (um) to 1.4 um wavelengths (e.g., centered at 1.24 um). The second detector 122 may be filtered with a center wavelength in the band between 1.5 um to 1.7 um (e.g., centered at 1.625 um). Accordingly, the multicolor pyrometer 110 is configured to determine a high target temperature T1, for example, in a range of 1000 Fahrenheit (F) to 2500 Farhenheit (F) as described in further detail below.

A band pass filter may have a full width half max of 50 nm, for example.

To measure a low target temperature T2, for example, in a range of 0 to 1000 Fahrenheit during a low temperature operation of the engine 10, a single color pyrometer 112 includes a third detector 152 that is filtered, for example, for the third wavelength band with a center wavelength in band within 3.3 um to 4.4 um wavelengths. In some embodiments of a single color pyrometer 112, the third detector 152 is a thermopile detector.

Although the single color pyrometer 112 may have lower accuracy with respect to the multicolor pyrometer 110, for transient temperatures (e.g., transient response of the gas), the accuracy of the single color pyrometer 112 does not need to be as high as the multicolor pyrometer 110. The low target temperature T2 from the single color pyrometer 112 may be used by the second engine control module 106 to determine if the engine is on or lit, the rate of change of the temperature (e.g., growing at a fast rate), and the like.

When hot, the turbine rotor blade 74 emits photons or light 118. Each detector 120, 122, 152 receives photons or light 118 having wavelengths that are within the respective optical sensing range and outputs a measured signal associated with the irradiance of the turbine rotor blade 74.

The detectors 120, 122, 152 may have custom band pass filters 170, 172, 174 that are specific to each color detector 120, 122, 152. The filters 170, 172, 174 filter a broad wavelength band radiation signal (e.g., light 118) from the turbine rotor blade 74 into a narrow wavelength band corresponding to the wavelength band for which the detectors 120, 122, 152 are filtered.

Alternatively, using a filter (e.g., a grating), the light enters the grating is spread spatially across a variety of detectors (e.g., pixels).

A measured signal of a detector 120, 122, 152 may be represented by the following equation:

$$I = F^*\varepsilon^* P(\lambda, Tb),$$

where I is the measured irradiance, F is fouling (e.g., attenuation of the light) associated with the thermal measurement system 100 (e.g., a dirty lens 116 affecting all detectors 120, 122, 152), $\varepsilon$ is the emissivity associated with the object (e.g., turbine rotor blade 74), $\lambda$ is wavelength, and Tb is blade temperature. The fouling and emissivity ($F^*\varepsilon$) may be more generally represented as a correction coefficient that may take into account fouling, attenuation, emissivity, and additional factors such as clipping due to misalignment.

From Planck's law, P is defined as the irradiance for a blackbody, given by:

$$P(\lambda, Tb) = C_1/(\lambda^5[\exp(C_2/\lambda Tb)-1]),$$

with $C_1 = 1.19 \times 104$ W um4/cm2 Sr and $C_2 = 1.438 \times 104$ um*K. In this formulation, the wavelength bands for the detectors 120, 122 are selected such that the gas absorption can be assumed to be zero.

Fouling and emissivity are generally unknown and a change in fouling may look like a change in temperature in the measurement of irradiance I. The multicolor pyrometer 110 may be used to calculate the blade temperature Tb (the high target temperature T1) in the high temperature range (e.g., for the first engine control module 104) using the ratio of a first measurement I1 from the first detector 120 to a second measurement I2 from the second detector 122. Using the ratio, the fouling and emissivity cancel and the blade temperature Tb (e.g., the high target temperature T1) can be calculated as follows. The ratio is given as:

$$I1/I2 = P(\lambda 1, Tb)/P(\lambda 2, Tb).$$

Substituting the irradiance P from Planck's law, the ratio becomes:

$$I1/I2 = (\exp(C2/(\lambda 2\ Tb))-1)/(\exp(C2/(\lambda 1\ Tb))-1).$$

With good approximation the "−1" can be ignored to arrive at:

$$Tb = C2(1/\lambda 2 - 1/\lambda 1)\ln(I2/I1).$$

In FIG. 2, this calculation of blade temperature Tb as the high target temperature T1 may occur at a first temperature module 180. For example, the first temperature module 180 may store or access the constants for the calculation of blade temperature Tb (including constants C1, C2 and the wavelength $\lambda 1, \lambda 2$ associated with the detectors 120, 122) and receive a first measurement of irradiance I1 from the first detector 120 and a second measurement of irradiance I2 from the second detector 122.

Once the blade temperature Tb (e.g., the high target temperature T1) is determined by the first temperature module 180, the first temperature module 180 provides the high target temperature T1 to the engine control 102 as input to the first engine control module 104.

At a correction module 182, a correction factor (e.g., fouling and emissivity ($F^*\varepsilon$)) may be determined using the value of the high target temperature T1 and one of the first measurement of irradiance I1 and the second measurement of irradiance I2 as follows:

$$F^*\varepsilon = I/(P(\lambda, Tb)).$$

The first temperature module 180 may provide the high target temperature T1 to the correction module 182 and the correction module 182 receives a measurement of irradiance I1, I2 from one of the detectors 120, 122 (e.g., in FIG. 2, the second measurement of irradiance I2 is received from detector 122). The correction module 182 may store or access the constants for the calculation of the correction factor (e.g., fouling and emissivity). For example, the correction module 182 may store constants C1, C2, and the wavelength $\lambda 1, \lambda 2$ associated with the detector 120, 122 from which the measurement of irradiance I1, I2 is received.

Once the correction factor (e.g., fouling and emissivity) is determined by the correction module 182, the value for the correction factor (e.g., fouling and emissivity) may be stored (e.g., in a memory 184) for later use by a second temperature module 186.

The value for the correction factor (e.g., fouling and emissivity) is used to correct a third measurement of irradiance I3 measured by the third detector 152 of the single color pyrometer 112. Attenuation or fouling from the multicolor pyrometer 110 can be used at a different wavelength, time, operation, and temperature, for example, because the multicolor pyrometer 110 and the single color pyrometer 112 are in the same sensor housing 114 and have the same lens 116. For example, if the lens 116 is dirty, all detectors 120, 122, 152 are affected. Emissivity may be wavelength or temperature dependent, and in some cases, there may be a correction to account for wavelength or temperature.

The value for fouling and emissivity does not have to be measured in real time to be able to be used by the single color pyrometer 112. For example, the fouling or attenuation generally changes slowly over time with respect to the frequency with which the value is determined and used.

The second temperature module 186 may calculate the blade temperature Tb (e.g., the low target temperature T2) in the low temperature range as input for the second engine control module 106. The second temperature module 186 may access the stored value of the correction factor (e.g., fouling and emissivity) from the memory 184 and receive a third measurement of irradiance I3 from the third detector 152.

Although the value of the correction factor (e.g., fouling and emissivity) is calculated for a different temperature and at a different time to monitor a different operation of an engine 10, the fouling or attenuation may change slowly over time and emissivity at the higher temperature can be used to approximate the emissivity at the lower temperature. The second temperature module 186 may determine the low target temperature T2 according to:

$$Tb = (\lambda/C_2) * \ln(F * \varepsilon * [C_1/(\lambda^5 * I)] + 1).$$

The second temperature module 186 may store or access the constants for the calculation of the low target temperature T2 (including constants C1, C2, and the wavelength λ3 and frequency f3 associated with the third detector 152 from which the third measurement of irradiance I3 is received).

Once the low target temperature T2 is determined by the second temperature module 186, the second temperature module 186 provides the low target temperature T2 to the engine control 102 as input for the second engine control module 106.

In at least certain embodiments, the thermal measurement system 100 and the engine control 102 may be or include one or more computing device(s). For purposes, of teaching a computing device 190 of the thermal measurement system 100 is described in further detail and the description of the computing device 190 is applicable to a computing device of the engine control 102.

The computing device(s) 190 can include one or more processor(s) 192 and one or more memory device(s) 184. The one or more processor(s) 192 can include any suitable processing device, such as a microprocessor, microcontroller, integrated circuit, logic device, and/or other suitable processing device.

The one or more memory device(s) 184 can include one or more computer-readable media, including, but not limited to, non-transitory computer-readable media, RAM, ROM, hard drives, flash drives, and/or other memory devices.

The one or more memory device(s) 184 can store information accessible by the one or more processor(s) 192, including computer-readable instructions 194 (e.g., modules 180, 182, 186, 104, 106 described above) that can be executed by the one or more processor(s) 192. The instructions 194 can be any set of instructions that when executed by the one or more processor(s) 192, cause the one or more processor(s) 192 to perform operations.

In some embodiments, the instructions 194 can be executed by the one or more processor(s) 192 to cause the one or more processor(s) 192 to perform operations, such as any of the operations and functions for which the thermal measurement system 100 and/or the computing device(s) 190 are configured, receiving measurements from the detectors 120, 122, 152, as described herein, calculating temperatures T1, T2, calculating a value of a correction factor including fouling and emissivity, low temperature monitoring and control, high temperature monitoring and control, and/or any other operations or functions of the one or more computing device(s) 190. The instructions can be software written in any suitable programming language or can be implemented in hardware. Additionally, and/or alternatively, the instructions can be executed in logically and/or virtually separate threads on processor(s).

The memory device(s) 184 can further store data 196 that can be accessed by the one or more processor(s) 192. For example, the data 196 can include constants in the above equations, calculations of fouling and emissivity, calculations of temperature, wavelengths and frequencies associated with the detectors 120, 122, 152, and/or any other data and/or information described herein.

The computing device(s) 190 can also include a network interface 198 used to communicate, for example, with the other components. The network interface 198 can include any suitable components for interfacing with one or more network(s), including for example, transmitters, receivers, ports, controllers, antennas, and/or other suitable components.

Figure 4:
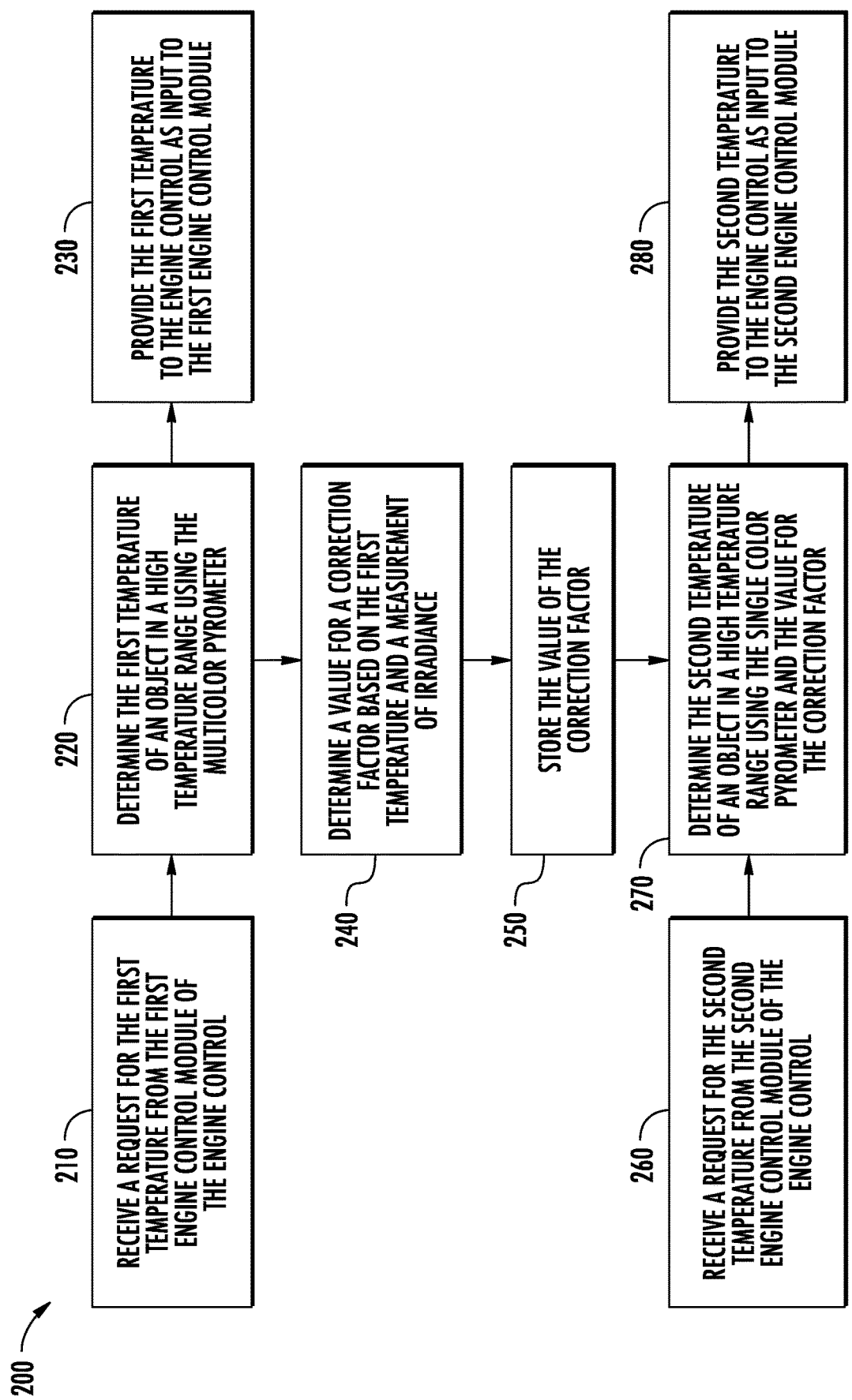
FIG. 4 is an illustration of a method in accordance with an exemplary aspect of the disclosure.

The thermal measurement system 100 (e.g., the computing device 190) may perform a method 200 as shown in FIG. 4. According to a first step 210, the thermal measurement system 100 may receive a request for the high target temperature T1 from the engine control 102. The engine control 102 may request the high target temperature T1 as input to first engine control module 104. For example, the first engine control module 104 may use the high target temperature T1 to determine the performance status and health of components of the engine 10 during one of idle, takeoff, cruise, and approach.

At a second step 220, the thermal measurement system 100 determines the high target temperature T1 of an object (e.g., a turbine rotor blade 74) in a high temperature range using the multicolor pyrometer 110. The high temperature range may be 1200 to 2600 Fahrenheit or 900 to 1700 Kelvin (K).

The second step 220 includes measuring a first measurement of irradiance I1 at a first wavelength λ1 with the first detector 120 and measuring a second measurement of irradiance I2 at a second wavelength λ2 with the second detector 122. The second step 220 further includes determining the high target temperature T1 (e.g., as described above) with the first measurement of irradiance I1 at the first wavelength λ1 and the second measurement of irradiance I2 at the second wavelength λ2.

At a third step 230, the thermal measurement system 100 provides the high target temperature T1 to the engine control 102. The engine control 102 uses the high target temperature T1 as input to the first engine control module 104 to monitor and/or control the engine 10.

At a fourth step 240, the thermal measurement system 100 determines a value for a correction factor (e.g., fouling and emissivity) based on the high target temperature T1 and at least one of the first measurement of irradiance I1 at the first wavelength λ1 and the second measurement of irradiance I2 at the second wavelength λ2.

At a fifth step 250, the thermal measurement system 100 stores the value of the correction factor (e.g., fouling and emissivity).

At a sixth step 260, the thermal measurement system 100 may receive a request for the low target temperature T2 from the engine control 102. The engine control 102 may request the low target temperature T2 as input to the second engine control module 106. For example, the second engine control module 106 may monitor a change in the low target temperature T2 during startup of the engine 10 to confirm that the temperature is increasing after the engine 10 is started.

At a seventh step 270, the thermal measurement system 100 determines the low target temperature T2 in a low temperature range using the single color pyrometer 112. The low temperature range may be 500 to 1000 Fahrenheit (F) or 533 to 811 Kelvin (K).

The seventh step 270 includes measuring a third measurement of irradiance I3 at a third wavelength λ3 with the third detector 152 and accessing the value of the correction factor (e.g., the most recent value of fouling and emissivity). The seventh step 270 further includes calculating the low target temperature T2 (e.g., as described above) with the third measurement of irradiance I3 at the third wavelength λ3 and the value of the correction factor (e.g., fouling and emissivity).

At an eighth step 280, the thermal measurement system 100 provides the low target temperature T2 to the engine control 102. The engine control 102 uses the low target temperature T2 as input to the second engine control module 106 to monitor and/or control the engine 10.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

In sum, the systems and methods disclosed herein use a multi-color pyrometer configured to determine temperature in a high temperature range and a single-color pyrometer configured to determine temperature in a low temperature range. The system uses information gained from determination of a temperature in the high temperature range to facilitate later determining a temperature in a low temperature range.

The temperature in the high temperature range and the temperature in the low temperature range are used to monitor and control different engine operations that occur at different times. For example, the temperature in the high temperature range may be an input to adjust operation such as the firing rate of the gas turbine engine, the rate and/or ratio of fuel and air being combusted in the engine, etc. The temperature in the low temperature range may be an input for monitoring startup firing or transient behavior.

A multi-color optical pyrometer that is configured for the high temperature range may lack a signal in the low temperature range. A single color pyrometer is used instead for the low temperature range. Although the system does not measure temperature simultaneously in the high temperature range and the low temperature range, information that is gained from determining a temperature in the high temperature range can be used to later determine a temperature in the low temperature range. For example, because the multicolor pyrometer and the single color pyrometer use the same lens to receive light or photons emitted from an object in a hot gas path of an engine, fouling (e.g., attenuation) and emissivity information may be determined from determining a temperature in the high temperature range and used to determine a temperature in the low temperature range.

One benefit of the system is the ability of the single color pyrometer to measure a temperature in a low temperature range for a low temperature operation. Another benefit is that the single color pyrometer is co-located with the multicolor pyrometer. This co-location means adding less weight to the engine and using less space in the engine as compared to a completely separate measurement system such as a thermocouple.

Further aspects are provided by the subject matter of the following clauses:

A thermal measurement system comprising: a first detector configured to measure a first measurement of irradiance associated with a first wavelength; a second detector configured to measure a second measurement of irradiance associated with a second wavelength; a third detector configured to measure a third measurement of irradiance associated with a third wavelength; a computing device configured to: determine, based on a ratio of the first measurement of irradiance and the second measurement of irradiance, a high target temperature in a first temperature range; determine a value of a correction factor based on the high target temperature and one of the first measurement of irradiance and the second measurement of irradiance; and determine, based on the value of the correction factor and the third measurement of irradiance, a low target temperature in a second temperature range, wherein the second temperature range is below the first temperature range.

The thermal measurement system of one or more of these clauses, wherein the first temperature range is 1200 to 2600 Fahrenheit, and the second temperature range is 500 to 1000 Fahrenheit.

The thermal measurement system of one or more of these clauses, wherein the thermal measurement system is configured to measure a temperature of an object in a hot gas path of an engine.

The thermal measurement system of one or more of these clauses, wherein the first wavelength and the second wavelength are shorter than the third wavelength.

The thermal measurement system of one or more of these clauses, wherein: the first wavelength is in a range of 1.1 to 1.4 micrometers; the second wavelength is in a range of 1.5 to 1.7 micrometers; and the third wavelength is in a range of 3.3 to 4.2 micrometers.

The thermal measurement system of one or more of these clauses, wherein the first detector and the second detector are InGaAs detectors.

The thermal measurement system of one or more of these clauses, wherein the third detector is a thermopile detector.

The thermal measurement system of one or more of these clauses, wherein the thermal measurement system includes a multicolor pyrometer and a single color pyrometer, wherein the multicolor pyrometer includes the first detector and the second detector; and wherein the single color pyrometer includes the third detector.

The thermal measurement system of one or more of these clauses, comprising a lens through which light is received for the first detector, the second detector, and the third detector.

The thermal measurement system of one or more of these clauses, wherein the computing device is configured to provide the high target temperature and the low target temperature to an engine control.

The thermal measurement system of one or more of these clauses, wherein the computing device is configured to receive a first request for the high target temperature in the first temperature range from the engine control.

The thermal measurement system of one or more of these clauses, wherein the computing device is configured to measure the first measurement of irradiance and the second measurement of irradiance in response to the first request for the high target temperature in the first temperature range from the engine control.

The thermal measurement system of one or more of these clauses, wherein the computing device is configured to receive a second request for the low target temperature in the second temperature range from the engine control.

The thermal measurement system of one or more of these clauses, wherein the computing device is configured to measure the third measurement of irradiance and access the value of the correction factor in response to the second request for the low target temperature in the second temperature range from the engine control.

The thermal measurement system of one or more of these clauses, wherein the correction factor includes fouling and emissivity.

A method, comprising: determining, by a thermal measurement system, a high target temperature of an object in a hot gas path of an engine, wherein the high target temperature is in a first temperature range, wherein the high target temperature is determined based on: a first measurement of irradiance at a first wavelength with a first detector; and a second measurement of irradiance at a second wavelength with a second detector; determining, by the thermal measurement system, a value for a correction factor based on the high target temperature and at least one of the first measurement of irradiance at the first wavelength and the second measurement of irradiance at the second wavelength; and determining, by the thermal measurement system, a low target temperature of the object in the hot gas path of the engine, wherein the low target temperature is in a second temperature range, wherein the low target temperature is determined based on: a third measurement of irradiance at a third wavelength with a third detector; and the value of the correction factor; and wherein the second temperature range is below the first temperature range.

The method of one or more of these clauses, wherein the correction factor includes fouling and emissivity.

The method of one or more of these clauses, wherein the first temperature range is 1200 to 2600 Fahrenheit, and the second temperature range is 500 to 1000 Fahrenheit.

The method of one or more of these clauses, wherein the first wavelength and the second wavelength are shorter than the third wavelength.

The method of one or more of these clauses, comprising receiving, by the thermal measurement system through a lens, light for the first detector, the second detector, and the third detector from a turbine rotor blade in a hot gas path of the engine.

We claim:

1. A thermal measurement system comprising:
   a first detector configured to measure a first measurement of irradiance associated with a first wavelength;
   a second detector configured to measure a second measurement of irradiance associated with a second wavelength;
   a third detector configured to measure a third measurement of irradiance associated with a third wavelength; and
   a computing device configured to:
      determine, based on a ratio of the first measurement of irradiance and the second measurement of irradiance, a high target temperature in a first temperature range;
      determine a value of a correction factor based on the high target temperature and one of the first measurement of irradiance and the second measurement of irradiance; and
      determine, based on the value of the correction factor and the third measurement of irradiance, a low target temperature in a second temperature range, wherein the second temperature range is below the first temperature range.

2. The thermal measurement system of claim 1, wherein the first temperature range is 1200 to 2600 Fahrenheit, and the second temperature range is 500 to 1000 Fahrenheit.

3. The thermal measurement system of claim 1, wherein the thermal measurement system is configured to measure a temperature of an object in a hot gas path of an engine.

4. The thermal measurement system of claim 1, wherein the first wavelength and the second wavelength are shorter than the third wavelength.

5. The thermal measurement system of claim 1, wherein:
   the first wavelength is in a range of 1.1 to 1.4 micrometers;
   the second wavelength is in a range of 1.5 to 1.7 micrometers; and
   the third wavelength is in a range of 3.3 to 4.2 micrometers.

6. The thermal measurement system of claim 1, wherein the first detector and the second detector are InGaAs detectors.

7. The thermal measurement system of claim 1, wherein the third detector is a thermopile detector.

8. The thermal measurement system of claim 1, wherein the thermal measurement system includes a multicolor pyrometer and a single color pyrometer, wherein the multicolor pyrometer includes the first detector and the second detector; and wherein the single color pyrometer includes the third detector.

9. The thermal measurement system of claim 1, comprising a lens through which light is received for the first detector, the second detector, and the third detector.

10. The thermal measurement system of claim 1, wherein the computing device is configured to provide the high target temperature and the low target temperature to an engine control.

11. The thermal measurement system of claim 10, wherein the computing device is configured to receive a first request for the high target temperature in the first temperature range from the engine control.

12. The thermal measurement system of claim 11, wherein the computing device is configured to measure the first measurement of irradiance and the second measurement of irradiance in response to the first request for the high target temperature in the first temperature range from the engine control.

13. The thermal measurement system of claim 11, wherein the computing device is configured to receive a second request for the low target temperature in the second temperature range from the engine control.

14. The thermal measurement system of claim 13, wherein the computing device is configured to measure the third measurement of irradiance and access the value of the correction factor in response to the second request for the low target temperature in the second temperature range from the engine control.

15. The thermal measurement system of claim 1, wherein the correction factor includes fouling and emissivity.

16. A method, comprising:
determining, by a thermal measurement system, a high target temperature of an object in a hot gas path of an engine, wherein the high target temperature is in a first temperature range, wherein the high target temperature is determined based on:
  a first measurement of irradiance at a first wavelength with a first detector; and
  a second measurement of irradiance at a second wavelength with a second detector;
determining, by the thermal measurement system, a value for a correction factor based on the high target temperature and at least one of the first measurement of irradiance at the first wavelength and the second measurement of irradiance at the second wavelength; and
determining, by the thermal measurement system, a low target temperature of the object in the hot gas path of the engine, wherein the low target temperature is in a second temperature range, wherein the low target temperature is determined based on:
  a third measurement of irradiance at a third wavelength with a third detector; and
  the value of the correction factor; and
wherein the second temperature range is below the first temperature range.

17. The method of claim 16, wherein the correction factor includes fouling and emissivity.

18. The method of claim 16, wherein the first temperature range is 1200 to 2600 Fahrenheit, and the second temperature range is 500 to 1000 Fahrenheit.

19. The method of claim 16, wherein the first wavelength and the second wavelength are shorter than the third wavelength.

20. A non-transitory computer-readable medium, comprising instruction that, when executed by a processor, cause the processor to:
determine a high target temperature of an object in a hot gas path of an engine, wherein the high target temperature is in a first temperature range, wherein the high target temperature is determined based on:
  a first measurement of irradiance at a first wavelength with a first detector; and
  a second measurement of irradiance at a second wavelength with a second detector;
determine a value for a correction factor based on the high target temperature and at least one of the first measurement of irradiance at the first wavelength and the second measurement of irradiance at the second wavelength; and
determine a low target temperature of the object in the hot gas path of the engine, wherein the low target temperature is in a second temperature range, wherein the low target temperature is determined based on:
  a third measurement of irradiance at a third wavelength with a third detector; and
  the value of the correction factor; and
wherein the second temperature range is below the first temperature range.

* * * * *